US011171497B2

(12) United States Patent
Jiao et al.

(10) Patent No.: US 11,171,497 B2
(45) Date of Patent: Nov. 9, 2021

(54) AUTOMATIC WORKING SYSTEM, CHARGING STATION AND METHOD FOR RETURNING ROBOTIC MOWER TO CHARGING STATION

(71) Applicant: Positec Power Tools (Suzhou) Co., Ltd., Jiangsu (CN)

(72) Inventors: Shiping Jiao, Jiangsu (CN); Jiang Du, Jiangsu (CN); Yuanzhong Ran, Jiangsu (CN); Huihui Jiang, Jiangsu (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 49 days.

(21) Appl. No.: 16/360,887

(22) Filed: Mar. 21, 2019

(65) Prior Publication Data

US 2019/0222043 A1    Jul. 18, 2019

Related U.S. Application Data

(63) Continuation of application No. PCT/CN2017/101578, filed on Sep. 13, 2017.

(30) Foreign Application Priority Data

Sep. 23, 2016 (CN) .......................... 201610846619.3

(51) Int. Cl.
*H02J 7/00*       (2006.01)
*A01D 34/00*   (2006.01)
(Continued)

(52) U.S. Cl.
CPC ............ *H02J 7/0045* (2013.01); *A01D 34/00* (2013.01); *A01D 34/008* (2013.01); *B25J 5/007* (2013.01);
(Continued)

(58) Field of Classification Search
CPC ..................................................... H02J 7/0045
(Continued)

(56) References Cited

U.S. PATENT DOCUMENTS 7,332,890 B2 *   2/2008   Cohen .................. G05D 1/0227
                                                                320/109
7,389,156 B2 *   6/2008   Ziegler .............. A22C 17/0013
                                                                318/568.1
(Continued)

FOREIGN PATENT DOCUMENTS

CN          201562735 U       8/2010
CN          102687620            9/2012
(Continued)

OTHER PUBLICATIONS

State Intellectual Property Office of the P.R. China, International Search Report for PCT/CN2017/101578 dated Dec. 21, 2017.
(Continued)

*Primary Examiner* — Yalkew Fantu
(74) *Attorney, Agent, or Firm* — Middleton Reutlinger

(57) ABSTRACT

An automatic working system includes a robotic mower automatically moving and mowing in a working area, and a charging station for docking and charging of the robotic mower; the charging station includes: a charging support and a charging contact mounted on the charging support; and the robotic mower includes a housing, and a charging connector disposed on a lateral side of the housing and connected to the charging contact to receive electric energy when the robotic mower is in a docking position where the robotic mower is docked with the charging station. When the robotic mower is in the docking position, the charging support is located on a lateral side of the robotic mower, and the charging station is open in a front and back direction of the robotic mower to
(Continued)

form a passage for the robotic mower to enter and exit the charging station approximately along a same direction.

17 Claims, 16 Drawing Sheets

(51) Int. Cl.
  *B25J 5/00* (2006.01)
  *G05D 1/02* (2020.01)
  *H01R 13/631* (2006.01)
(52) U.S. Cl.
  CPC ......... *G05D 1/0225* (2013.01); *H01R 13/631* (2013.01); *G05D 2201/0208* (2013.01); *H01R 2201/26* (2013.01)
(58) Field of Classification Search
  USPC ....................................................... 320/109
  See application file for complete search history.

(56) References Cited

U.S. PATENT DOCUMENTS

| | | | |
|---|---|---|---|
| 9,045,049 B2* | 6/2015 | Hershey | ................ H02J 7/0047 |
| 2005/0029025 A1 | 2/2005 | Medina | |
| 2009/0183478 A1 | 7/2009 | Bernini | |
| 2009/0315501 A1 | 12/2009 | Li et al. | |
| 2010/0174434 A1 | 7/2010 | Sip | |
| 2014/0031979 A1* | 1/2014 | Borinato | .............. G05D 1/0225 700/245 |
| 2014/0327389 A1 | 11/2014 | Elonsson | |
| 2015/0077045 A1* | 3/2015 | Harris | ................. A01D 34/008 320/108 |
| 2015/0328775 A1 | 11/2015 | Shamlian et al. | |
| 2016/0332526 A1 | 11/2016 | Svensson et al. | |

FOREIGN PATENT DOCUMENTS

| | | |
|---|---|---|
| CN | 103425073 A | 12/2013 |
| CN | 104010485 | 8/2014 |
| CN | 104010485 A | 8/2014 |
| CN | 105359705 | 3/2016 |
| CN | 206611777 U | 11/2017 |
| DE | 3918867 | 10/1989 |
| EP | 2082638 | 7/2009 |
| EP | 2679084 | 1/2014 |
| EP | 3069593 | 9/2016 |
| EP | 3069593 A1 | 9/2016 |
| EP | 2797401 | 1/2018 |
| EP | 3354124 A1 | 8/2018 |
| JP | 2016010382 A | 1/2016 |
| KR | 20160111229 | 9/2016 |
| WO | 2011011803 | 2/2011 |
| WO | 2013100833 | 7/2013 |
| WO | 2015108454 | 7/2015 |

OTHER PUBLICATIONS

Youtube; AL-KO Robolinho 3000: URL: https://www.youtube.com/watch?v=9L7Od A1f_I; Published Feb. 6, 2013.
AL-KO Robolinho 3000 Robot lawnmower Operating Instructions, Oct. 2012.

* cited by examiner

AUTOMATIC WORKING SYSTEM, CHARGING STATION AND METHOD FOR RETURNING ROBOTIC MOWER TO CHARGING STATION

BACKGROUND

Technical Field

The present invention relates to an automatic working system consisting of a robotic mower and a charging station, and the present invention further relates to a charging station in the automatic working system and a method for returning the robotic mower to the charging station.

Related Art

With the development of science and technology, robotic mowers are well known by people. Since the robotic mowers can execute preset related tasks according to an automatically preset program without manual operation and intervention, their applications to industry and household products are very wide. The applications to the industry for example comprise robots executing various functions, the applications to the household products for example comprise mowers, dust collectors, and the like, and these intelligent devices greatly save time for people, and bring about great convenience to both industrial production and home life. But since these robotic mowers are battery-powered, after an electric quantity of a battery is used up, these robotic mowers cannot work. Therefore, it is generally set that when the electric quantity of a robotic mower is lower than a set value, the program selectively controls an automatic mobile device to return to a charging station to charge the battery.

Usually, a charging contact is disposed in front of the robotic mower, the charging station is generally set to allow entrance of the automatic mobile device to execute a charging action, and after charging is finished, the automatic mobile device needs to exit the charging station to continuously execute work. Such working mode necessarily results in that the robotic mowers cannot cover a working area behind the charging station or even on both sides of the charging station. In addition, actions of entering and exiting the charging station need to be finished for charging each time, and after a long time, an entrance area of the charging station is ground by the robotic mower for multiple times, ground vegetation deterioration is caused, or ground dents are generated.

Therefore, it is necessary to develop an automatic working system capable of enabling the robotic mowers not need to retreat after the charging is finished, and the robotic mowers can be directly driven away from the charging station along a direction of entering the charging station after being fully charged, so as to continuously execute mowing work.

SUMMARY

In an embodiment, a technical solution is an automatic working system including: a robotic mower automatically moving and mowing in a working area, and a charging station for docking and charging of the robotic mower. The charging station includes: a charging support and a charging contact mounted on the charging support. The robotic mower includes a housing; and a charging connector disposed on a lateral side of the housing and connected to the charging contact to receive electric energy when the robotic mower is in a docking position in which the robotic mower is docked with the charging station, where when the robotic mower is in the docking position, the charging support is located on a lateral side of the robotic mower, and the charging station is open in a front and back direction of the robotic mower to form a passage for the robotic mower to enter and exit the charging station approximately along a same direction.

In an embodiment, the invention provides a charging station for a robotic mower, which is simple in structure and convenient for charging. A specific technical solution is that the charging station for a robotic mower includes a charging support; and a charging contact mounted on the charging support, where the charging contact provides a charging voltage for the robotic mower when the robotic mower is in a docking position in which the robotic mower is docked with the charging station, where when the robotic mower is in the docking position, the charging support is located on a lateral side of the robotic mower, and the charging station is open in a front and back direction of the docking position of the robotic mower to form a passage for the robotic mower to enter and exit the charging station along a same direction.

In an embodiment, the invention provides a method for returning a robotic mower to a charging station. A specific technical solution is that: for the method for returning a robotic mower to a charging station, the robotic mower automatically moves and mows in a working area, the charging station allows docking and charging of the robotic mower, the charging station includes a charging support and a charging contact mounted on the charging support; and the robotic mower includes a housing, and a charging connector disposed on a lateral side of the housing and connected to the charging contact to receive electric energy when the robotic mower is in a docking position in which the robotic mower is docked with the charging station, the robotic mower also has a guide control module to control the robotic mower to return to the charging station, and the method includes the following steps.

S1: The robotic mower returns to a vicinity of the charging station by the guide control module;

S2: After reaching the vicinity of the charging station, continue to advance according to a control signal of the guide control module, and detect whether the charging contact and the charging connectors are successfully connected;

S3: If a judgment result of S2 is yes, the robotic mower reaches the docking position, and the robotic mower executes braking for charging;

S4: If the charging of the robotic mower is completed or a signal of departing from the charging station is received, the robotic mower continues to depart from the charging station approximately along a direction of entering the charging station.

BRIEF DESCRIPTION OF THE DRAWINGS

The technical problems to be resolved, technical solutions and beneficial effects of the present invention above can be clearly obtained by detailed description on specific embodiments of the present invention hereinafter in combination with the accompanying drawings.

The same numerals and signs in the accompanying drawings and description are used for representing the same or equivalent elements.

DETAILED DESCRIPTION

The detailed description and technical content related to the present invention are described in combination with the accompanying drawings. The accompanying drawings merely provide reference and description, instead of limiting the present invention.

FIG. 1 to FIG. 6 show an automatic working system provided by an example embodiment.

Figure 1:
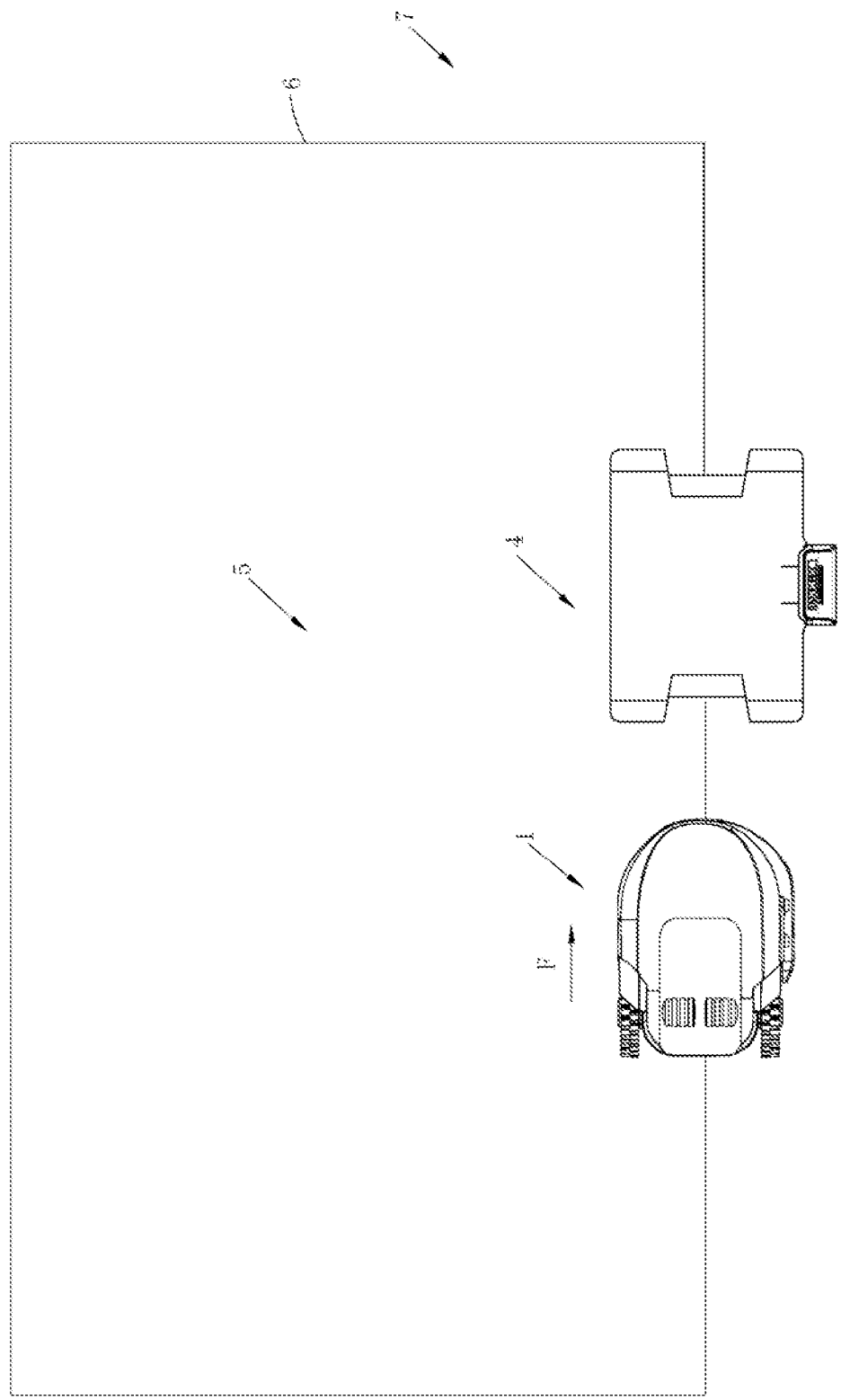
FIG. 1 is a schematic diagram of an automatic working system of a robotic mower according to an example embodiment.

The automatic working system shown in FIG. 1 includes a robotic mower 1 and a charging station 4. The robotic mower automatically works in a working area 5 defined by a border 6 and is prevented from entering a nonworking area 7.

In this embodiment, the charging station 4 is disposed in a position nearby the border 6. Under a condition of insufficient electric quantity and the like, the robotic mower 1 can automatically return to the charging station 4 by using a guide control module, and be charged by means of being docked with the charging station. In this embodiment, the robotic mower returns to the charging station along the border 6. Specifically, the robotic mower 1 is provided with a border sensor to detect the position of the border, and when needing to return to the charging station 4, the robotic mower 1 is guided by the guide control module according to a detection result of the border sensor to first walk to reach the border 6, and keep walking along the border 6 until reaching the charging station 4. More specifically, the border 6 is formed by a border line connected to the charging station 4, a border electric signal is transmitted on the border line, and the border sensor is a sensor for detecting the border electric signal, such as an inductor, a hall sensor, or the like. In other embodiments, the robotic mower may return to the charging station in other manners. For example, the robotic mower determines the position of the charging station through a satellite navigation technology and returns, or the robotic mower recognizes the position of the charging station by using an image technology and returns, which is not repeated.

Figure 2:
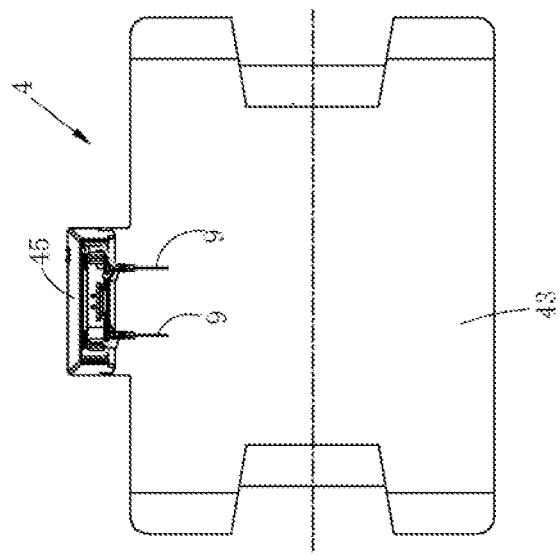
FIG. 2 is a schematic arrangement diagram of a charging contact of the automatic working system shown in FIG. 1.
Figure 2:
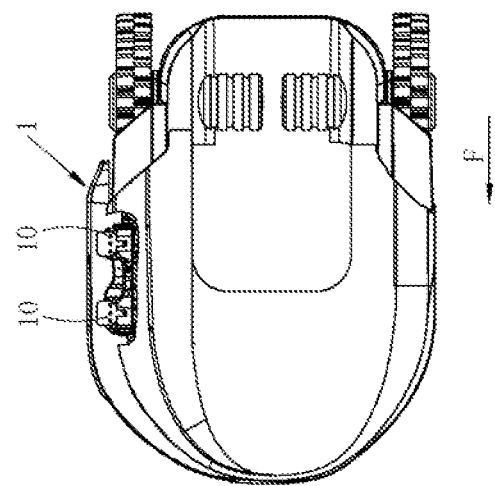

Continuing to refer to FIG. 1 and FIG. 2, the robotic mower 1 includes a housing and a charging connector 10. The charging connector 10 is disposed on a lateral side of the housing. The charging station 4 includes a charging support 45 and a charging contact 9 disposed on the charging support 45. In this embodiment, the charging station also includes a bottom plate, and the charging support is disposed on the charging bottom plate. In a docking position, the charging connector and the charging contact abut against each other, the charging support 45 is located on a lateral side of the robotic mower, and the charging station is open in front of and behind the robotic mower to form a passage for the robotic mower to pass by along a straight direction. In this way, the robotic mower can drive into the charging station 4 along a normal straight direction, that is, a longitudinal axis direction of the robotic mower, enters the docking position to be charged, and continues to drive away from the charging station 4 along the straight direction. In the whole entering and departing process, the robotic mower does not need to retreat. Therefore, the robotic mower can mow grass behind the charging station, and can more comprehensively cover the working area in comparison with a traditional automatic working system that performs charging from the front.

In this embodiment, the charging support 45 is disposed on one lateral side of the charging bottom plate 43, and specifically, the charging support is disposed on a lateral side outside the working area 5, that is, in the nonworking area 7. In other embodiments, the charging support can also be disposed on two lateral sides of the charging bottom plate. Specifically, the charging support is set to be approximately vertical to the charging bottom plate. When the robotic mower is in the docking position, the charging support is located on the lateral side of the robotic mower and the charging station is open in a front and back direction of the robotic mower to form a passage for the robotic mower to depart from the charging station approximately along a direction of entering the charging station.

Figure 3:
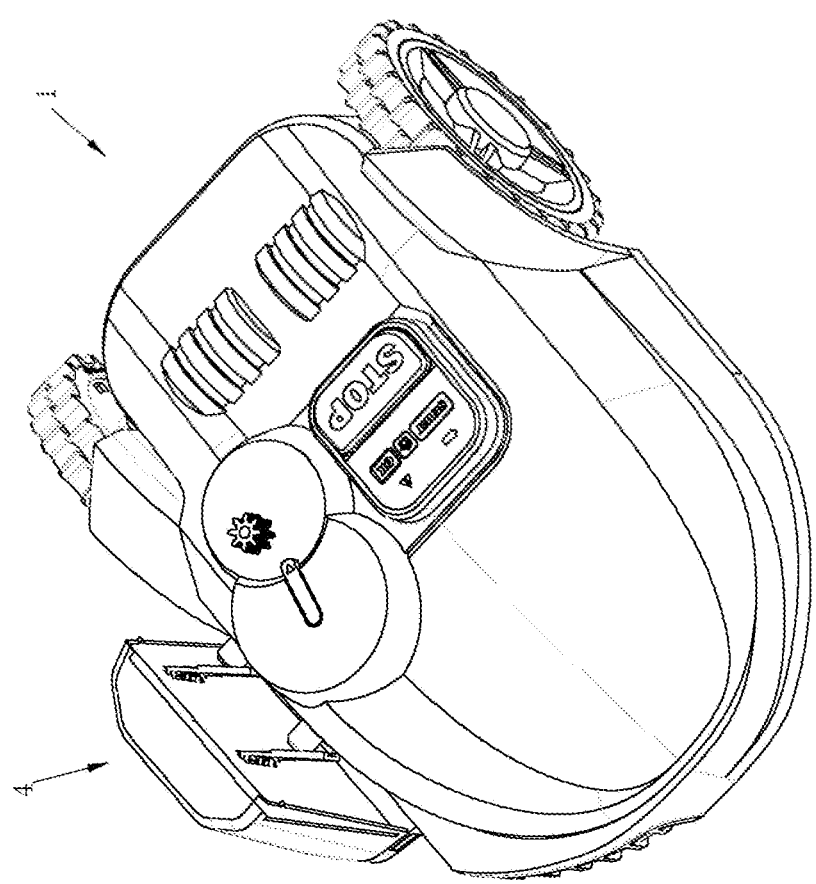
FIG. 3 is a schematic diagram of a charging state of the robotic mower shown in FIG. 1.
Figure 4:
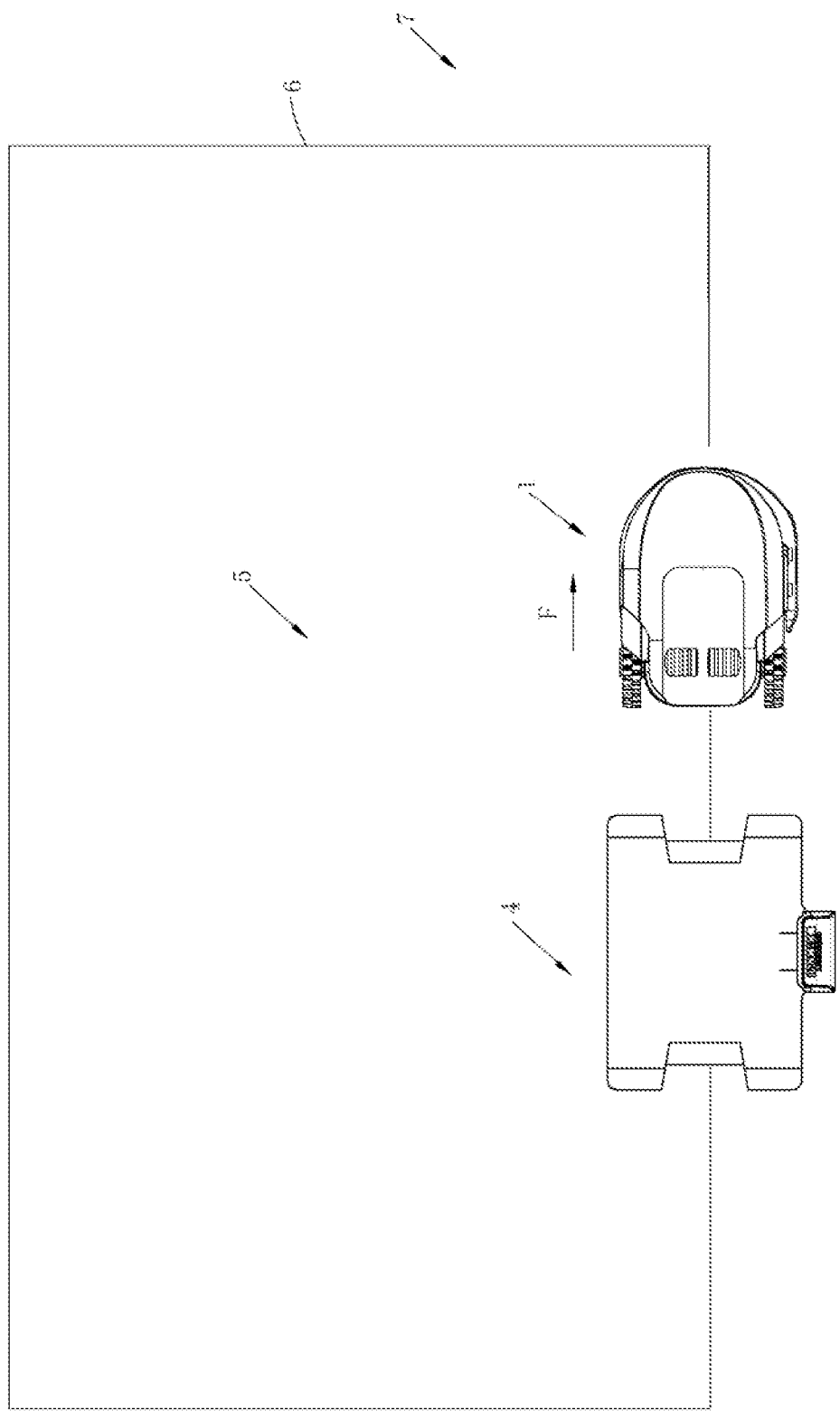
FIG. 4 is a top view that the robotic mower as shown in FIG. 1 departs from the charging station after charging is completed.

Referring to FIG. 3 and FIG. 4, in the docking position, the charging contact 9 on the charging station and the charging connector 10 on the robotic mower abut against each other to transmit electric energy to the robotic mower 1. In this embodiment, the charging contact 9 can elastically move between an extending-out position and a retreating position, and when in the retreating position, the robotic mower 1 can continue to move along a moving direction F of entering the docking position to depart from the charging station 4. A person skilled in the art may conceive that the charging contact 9 may also be set to move between the extending-out position and the retreating position by means of being triggered by a switch or being attracted by a magnetic force, and similarly, may also be set as another rigid deformation structure as long as the essence thereof is same as the solution and is covered within a protective scope of the present invention. In other embodiments, the charging connector 10 may also be set to move between the extending-out position and the retreating position. Similarly, the charging connector may be set to elastically move, and may also be set to move between the extending-out position and the retreating position by means of being attracted by a magnetic force or being triggered by a switch, or by using another rigid shape change. A person skilled in the art may conceive that only if at least one of the charging contact and the charging connector can move between the extending-out position and the retreating position, and when the at least one of the charging contact and the charging connector is in the retreating position, the robotic mower 1 can continue to move along a moving direction F of entering the docking position to depart from the charging station.

In this embodiment, single charging contact 9 is disposed to form an approximate right angle with the direction of the robotic mower 1 entering the charging station 4, and can rotate to a direction of decreasing or increasing the right angle. In other embodiments, the charging contact may also be set as a telescopic structure For example, the charging contact may telescopically move relative to the charging support by using an elastic connection element such as a spring. Detailed description is further made in combination with FIG. 5 and FIG. 6.

Figure 6:
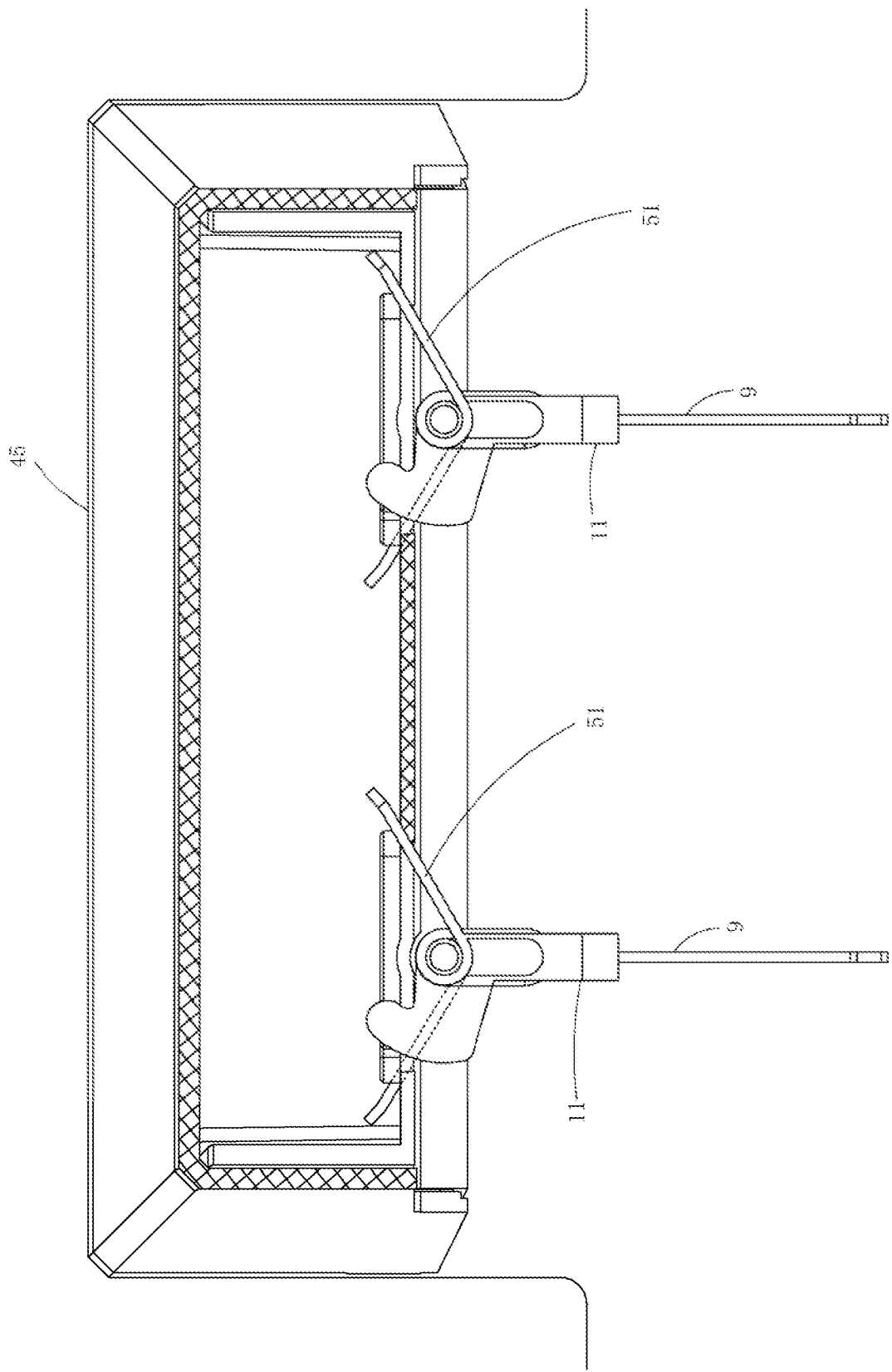
FIG. 6 is a schematic mounting structure diagram of a charging contact of a charging station of the automatic working system shown in FIG. 1.

Referring to FIG. 6 at first, the charging elastic piece 9 is elastically connected to the supporting support 45 by using the elastic connection portion. The charging contact 9 is approximately vertical to a mounting plane of the charging support 45, that is, approximately vertical to an advancing direction of the robotic mower entering the charging station. In this embodiment, the elastic connection portion comprises a supporting portion 11 supporting the charging contact 9, and a rotary spring 51 actuating the supporting portion 11 to rotate the supporting portion 11. Specifically, the rotary spring 51 is a double-pin spring and has a protrusion portion in the middle for connecting the supporting portion 11 of the charging contact. The middle protrusion portion is approximately vertical to the charging support. Two tail ends of the double-pin spring 51 have two pins. Due to the two pins, the charging contact 9 is approximately vertical to the supporting support 45. The rotary spring 51 is connected to the charging support by using a fixing shaft. The charging contact can move to a direction of the robotic mower entering the charging station and a direction opposite to the entering direction by an external force. The charging contact 9 is originally in a middle position, due to a structure of bidirectional moving with an external force, the robotic mower is enabled to directly retreat after failing docking, to continue to execute a docking task, without a need to make a turn to return a position of entering the charging station, thereby the docking is simpler and more convenient.

In this embodiment, the bidirectional moving structures of the charging contact 9 ensures that the robotic mower can smoothly enter the charging station and then drive away from the charging station along the entering direction, and can ensure that the robotic mower can reach the docking position from an advancing direction F or a retreating direction V to realize the docking and charging tasks.

Figure 5:
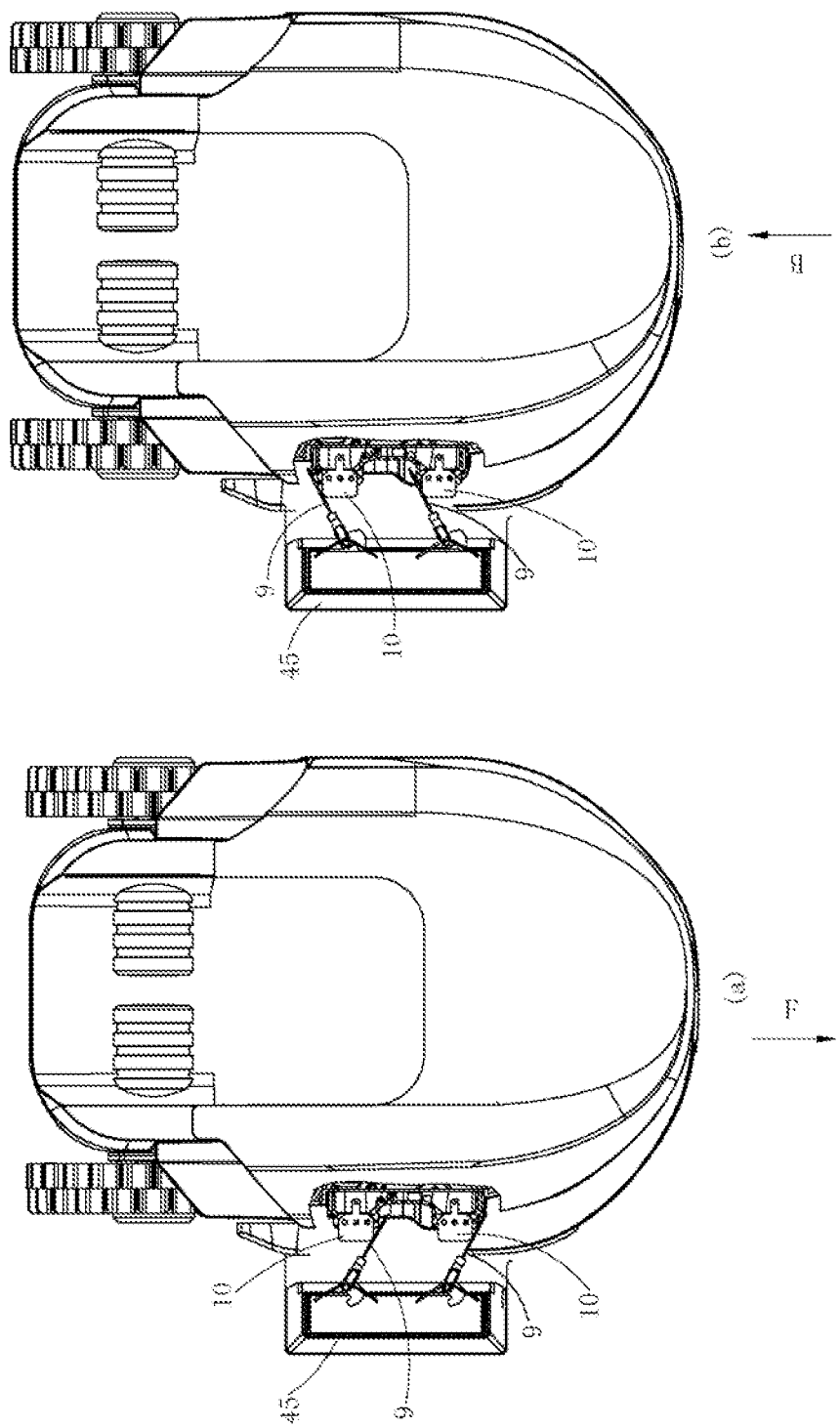
FIG. 5 is an arrangement local sectional view of a charging contact in two charging states of the robotic mower shown in FIG. 1.

Referring to FIG. 5, the charging connector 10 of the robotic mower 1 and the charging contact 9 have two abutting states, which are respectively shown in FIG. 5(a) and FIG. 5(b). Referring to FIG. 5(a), the robotic mower is docked with the charging contact 9 along the advancing direction F of entering the charging station. The charging contact 9 is inclined toward the advancing direction F and finally forms an acute angle with the advancing direction F of entering the charging station. The charging contact 9 and the charging connector 10 abut against each other to transmit electric energy to the robotic mower. When the robotic mower enters the charging station from the advancing direction F without enabling the charging connector 10 and the charging contact 9 to form an electric connection circuit and has crossed over the docking position, the robotic mower judges that the docking is failed and then executes related control actions. Specifically, when the robotic mower judges that the docking position has been crossed but the docking is not successful, the robotic mower executes a retreating action, and is docked again from a retreating direction V. In other embodiments, when the robotic mower has crossed over the docking position but is not successfully docked, the robotic mower executes a turning action to return to an initial position of entering the charging station to continue to execute the docking action. Referring to FIG. 5(b), the robotic mower is docked with the charging contact 9 along the retreating direction V, the charging contact 9 is inclined toward the retreating direction V and finally forms a blunt angle with the advancing direction F of entering the charging station. The charging contact 9 and the charging connector 10 abut against each other to transmit electric energy to the robotic mower.

The charging contact 9 is set as a bidirectional moving structure, such that the robotic mower can reach the docking position from the advancing direction F or the retreating direction V to realize the docking and charging tasks. In other embodiments, the charging contact may also be set as a semi-arc structure, a structure having two guide slopes, or a structure moving between the extending-out position and the retreating position under attraction of a magnetic force. A person skilled in the art may conceive that a structure should be covered within the protective scope of the present invention as long as the robotic mower can reach the docking position along the advancing direction F or the retreating direction V to achieve electric connection between the charging contact and the charging connector.

Figure 7:
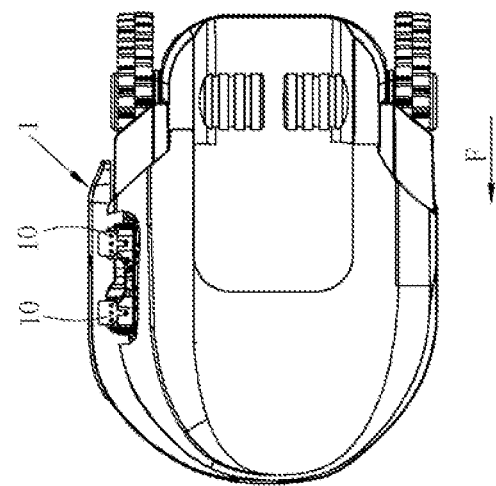
FIG. 7 is a schematic arrangement diagram of a charging contact of an automatic working system of a robotic mower according to an example embodiment.
Figure 7:
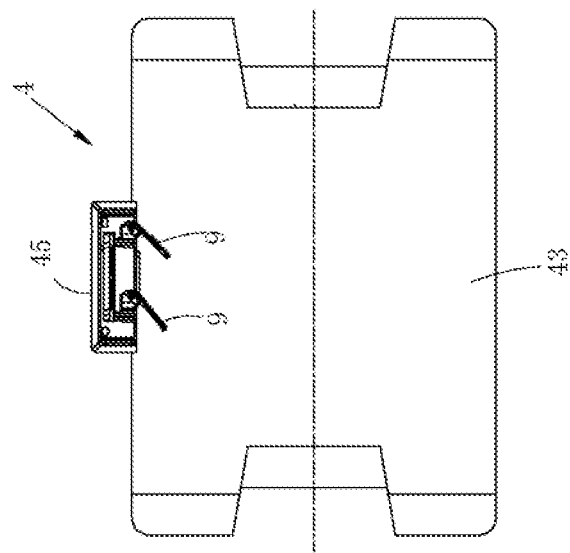
Figure 8:
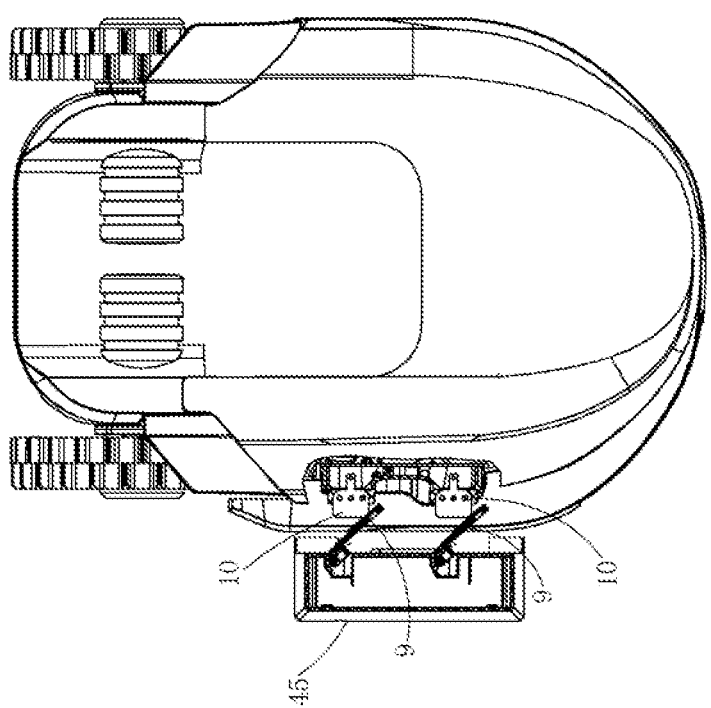
FIG. 8 is a schematic sate diagram of a charging contact when the robotic mower shown in FIG. 7 is charged.
Figure 9:
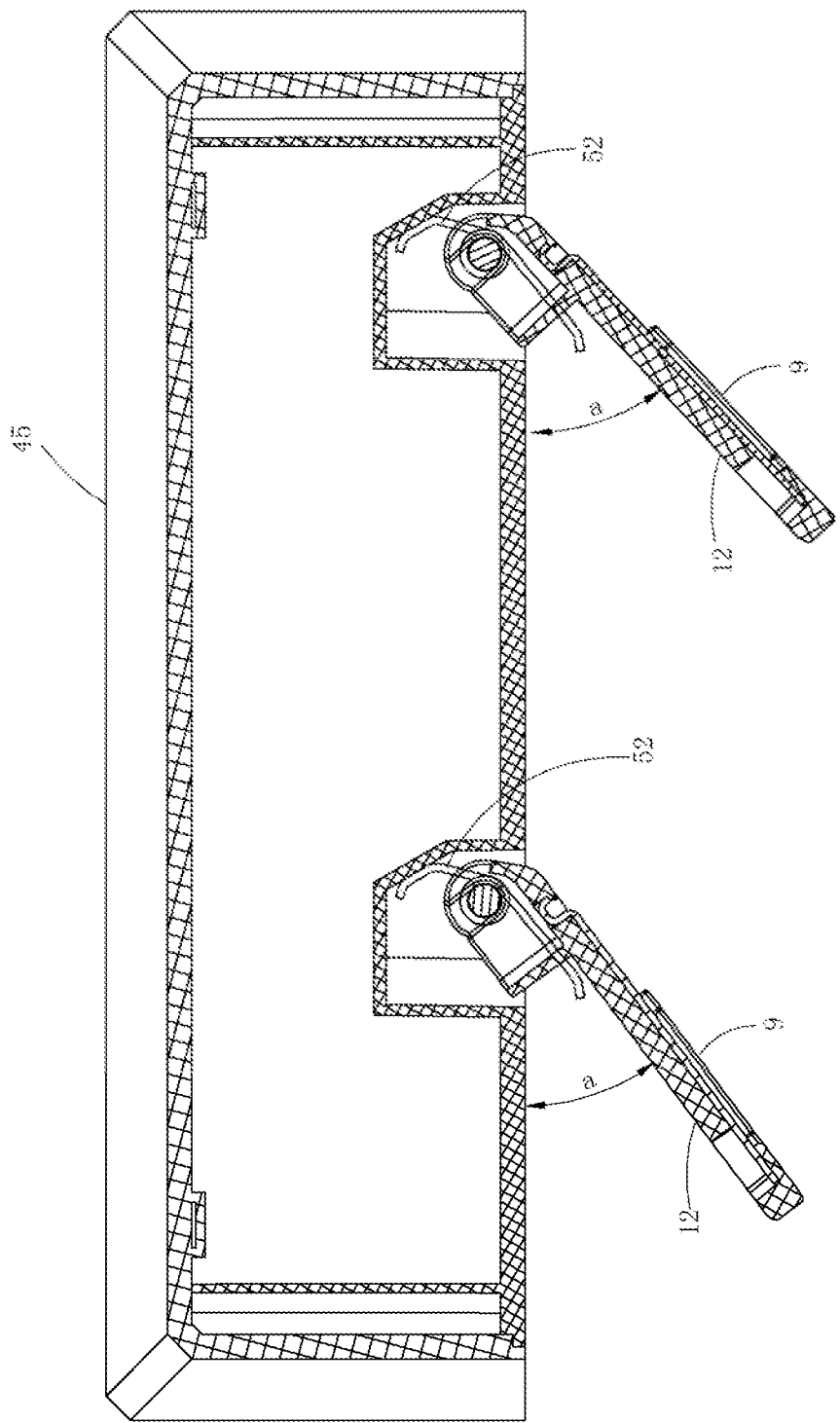
FIG. 9 is a schematic mounting structure diagram of a charging contact of a charging station of the automatic working system shown in FIG. 7.

FIG. 7 to FIG. 9 show an automatic working system provided by an example embodiment. For the sake of expression, the same structures are represented by same numbers, which is not described herein again.

Referring to FIG. 7 and FIG. 8, a charging connector 10 of the robotic mower 1 and a charging contact 9 of the charging station abut against each other to provide electric energy for the robotic mower. In this embodiment, an inclined direction of the charging contact 9 and the advancing direction F of the robotic mower form an acute angle or a right angle, the charging contact 9 can rotate to a direction of decreasing the acute angle or right angle relative to the charging support 45, and a rotation angle thereof is not larger than the right angle. The robotic mower can drive away from the charging station approximately along a direction of entering the charging station, and the robotic mower does not need to retreat in the whole process of entering and exiting the station.

A setting structure of the charging contact of this embodiment is described in detail in combination with FIG. 9.

Referring to FIG. 9, the charging contact 9 is elastically connected to the charging support 45 by using an elastic connection portion. The elastic connection portion comprises a supporting portion 12 supporting the charging contact 9 and a rotary spring 52 actuating the supporting portion 12 to rotate the supporting portion 12. Specifically, the rotary spring 52 is connected to the charging support by using a fixing shaft and can rotate around the fixing shaft in a range of 90°. In this embodiment, an included angle a between an inclined direction of the charging contact 9 and the direction F of the robotic mower 1 entering the charging station 4 is not larger than the right angle, and the charging contact 9 can rotate to a direction of decreasing the included angle a. If the robotic mower fails to dock, the robotic mower will return to the initial position of entering the charging station to continue to execute the docking task.

The structure setting of the charging contact 9 rotating within a range of 90° ensures that the robotic mower can smoothly enter the charging station and can drive away from the charging station along the entering direction. The elastic structure of the charging contact ensures that charging and docking are more sufficient, and avoids reduction of charging efficiency caused by poor contact. A person skilled in the art may conceive that the charging contact 9 of the charging station of the automatic working system and the charging connector 10 on the robotic mower 1 can exchange positions with each other. All technical solutions similar to this embodiment should be covered in the protective scope of the present invention.

Figure 10:
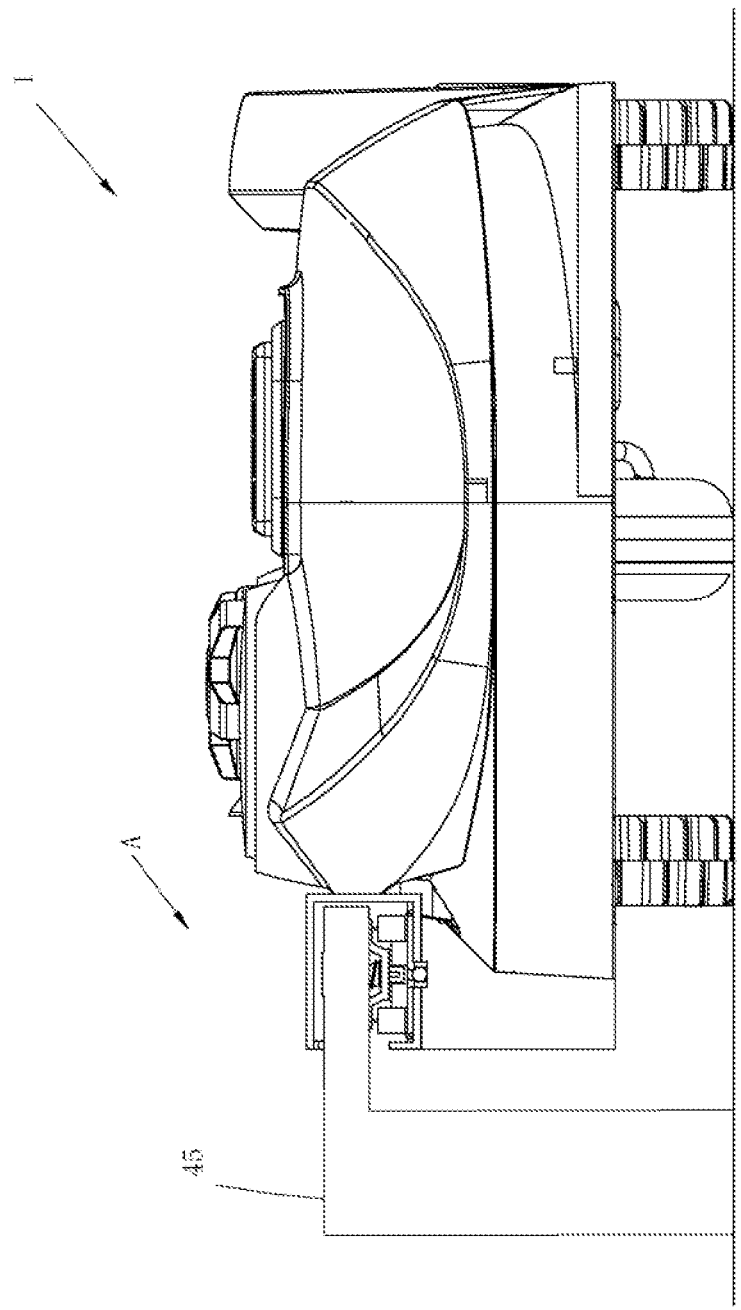
FIG. 10 is a schematic diagram of a charging state of a robotic mower according to an example embodiment.
Figure 11:
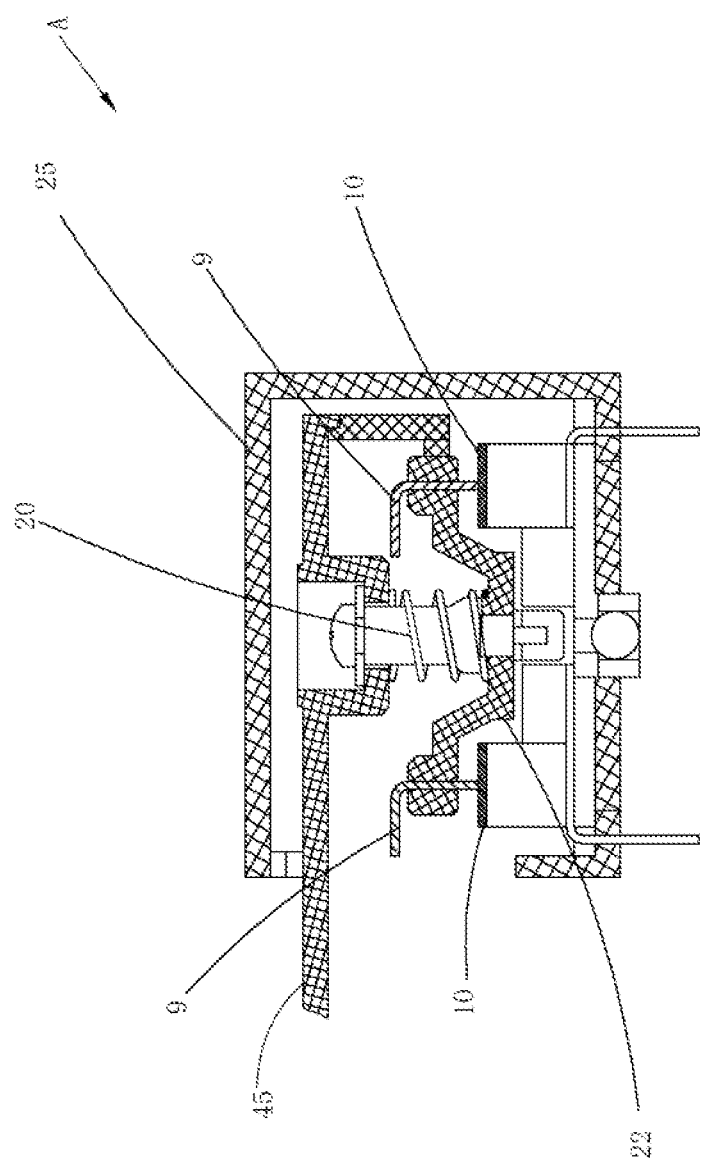
FIG. 11 is an arrangement local sectional view of a charging contact in a charging state of the automatic working system shown in FIG. 10.

FIG. 10 and FIG. 11 show an automatic working system provided by an example embodiment of the present invention. For the sake of expression, the same structures are represented by the same numbers, which is not described herein again.

Referring to FIG. 10, charging contact 9 is elastically connected to the charging support 45 by using an elastic connection portion, and the charging contact 9 can telescopically move relative to the charging support. Two charging connectors 10 are disposed on one side wall of the charging slot 25 in parallel. The charging connectors may also be arranged in other manners, for example, in straight arrangement. Specifically, the elastic connection portion comprises a supporting portion 22 and a spring 20 of the charging contact 9. In this embodiment, a charging slot 25 is disposed on a lateral side of the housing of the robotic mower, the charging slot has openings in front of and behind the direction of the robotic mower entering the charging station, and at least one opening in the lateral side, and the charging connectors are disposed on a side wall of the charging slot. The side wall of the charging slot 25 refers to other surrounding walls parallel with the direction of the robotic mower entering the charging station. The charging slot has the openings in front of and behind the direction of which the robotic mower entering the charging station, such that the charging support and the charging contact 9 can freely enter and exit the charging slot, and the robotic mower can enter the charging station and can continue to drive away from the charging station along the entering direction.

Along a direction of a section L in FIG. 10, a local section A is obtained, specifically referring to FIG. 11. In this embodiment, the charging connectors 10 are fixedly connected to the charging slot 25. Specifically, the charging connectors 10 are disposed on a side wall below the charging slot. The charging support 45 of the charging station extends to form an extending structure, the charging contact is disposed on the extending structure, and the extending structure and the charging contact can enter the charging slot 25 in parallel and can exit along the entering direction. The charging contact has an approximately trapezoid shape with round and smooth corners, and due to such structure, the docking impact between the charging contact and the charging connectors is reduced, and connection is easier to achieve. The supporting portion 22 is elastically connected to the charging support 45 by the spring 20, the charging contact 9 can telescopically move under actions of the spring 20. Such elastic connection ensures full contact between the charging contact and the charging connectors, and can buffer the impact against the charging station caused by a machine entering the station to be charged.

Figure 12:
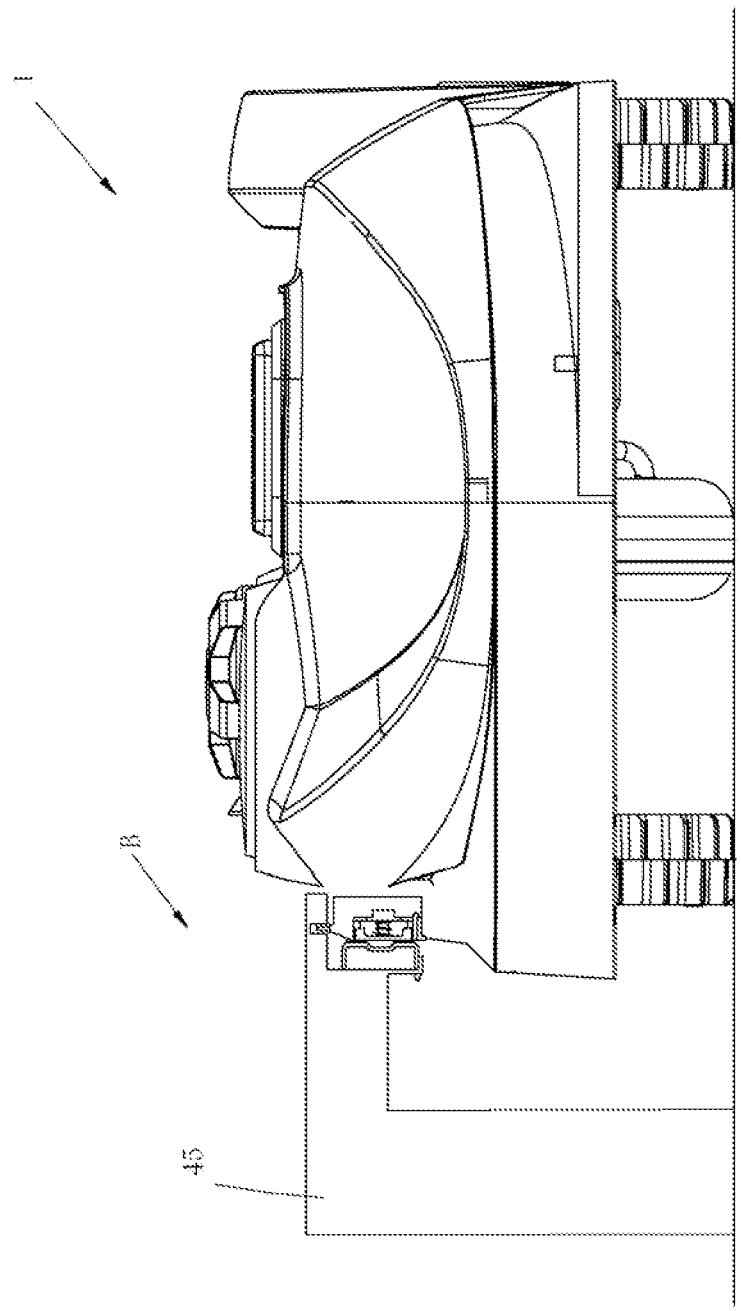
FIG. 12 is a schematic diagram of a charging state of a robotic mower according to an example embodiment.
Figure 13:
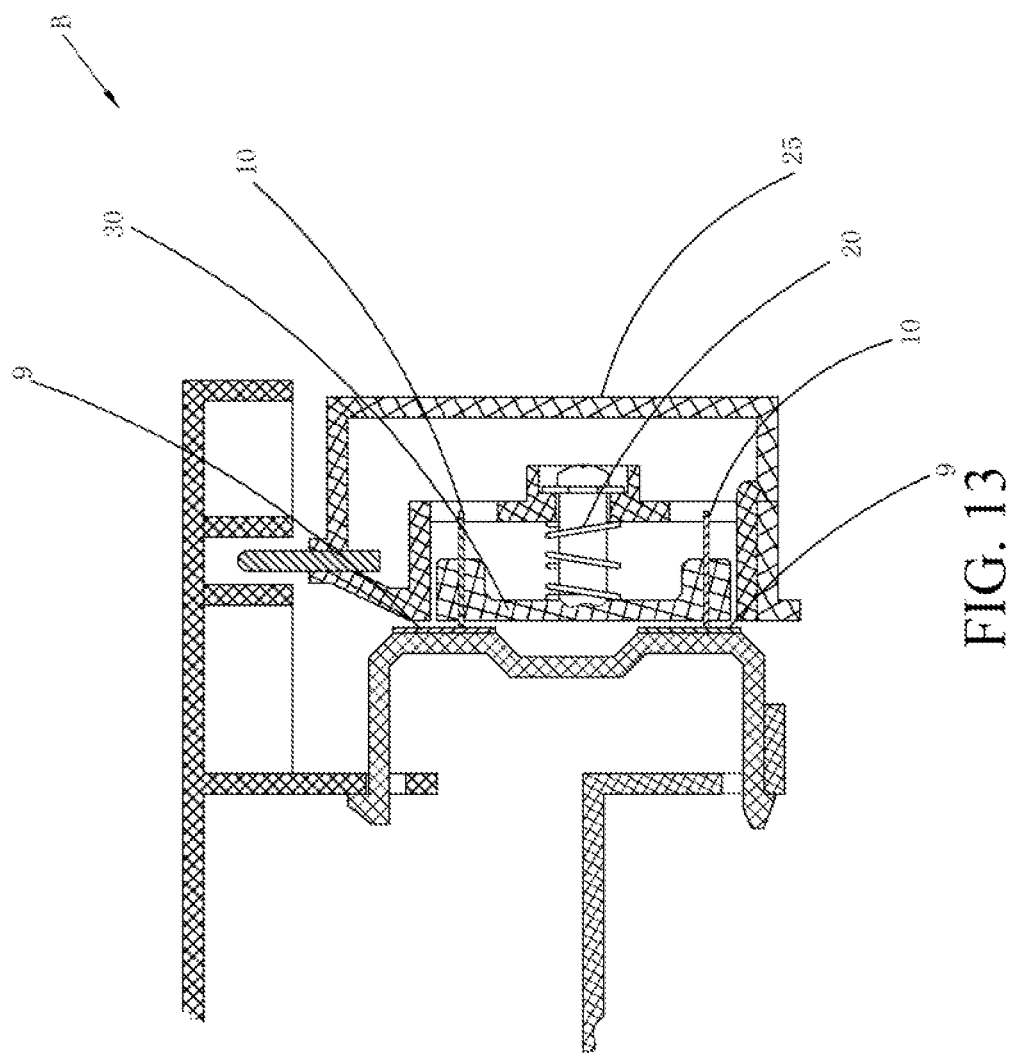
FIG. 13 is an arrangement local sectional view of a charging contact in a charging state of the automatic working system shown in FIG. 12.

FIG. 12 and FIG. 13 show an automatic working system provided by an example embodiment. For the sake of expression, the same structures are represented by the same numbers, which is not described herein again.

Referring to FIG. 12 and FIG. 13, charging connector 10 is elastically connected to the robotic mower by using an elastic connection portion, and the charging connector 10 can telescopically move relative to the robotic mower 1. Two charging connectors 10 are disposed on a side wall of a charging slot 25 in parallel or straightly. Specifically, the elastic connection portion comprises a supporting portion 30 and a spring 20 of the charging connector 10. A local section B is obtained along the direction of a section M. In this embodiment, the charging contact 9 is fixedly disposed on the charging support. Two charging contacts are disposed on the charging support in parallel or straightly, the charging connectors 10 are disposed correspondingly, the charging connectors 10 are elastically connected to a charging slot 25 by using the elastic connection portion, and the elastic connection portion comprises the supporting portion 30 supporting the charging connectors 10 and the spring 20 actuating the supporting portion 30 to telescopically move the supporting portion 30. The charging connector 10 has an approximately trapezoid shape with round and smooth corners, the charging connector can telescopically move under the action of the springs. Such elastic connection ensures full contact between the charging contact and the charging connector, and can buffer the impact against the charging station caused by a machine entering the station to be charged.

Figure 14:
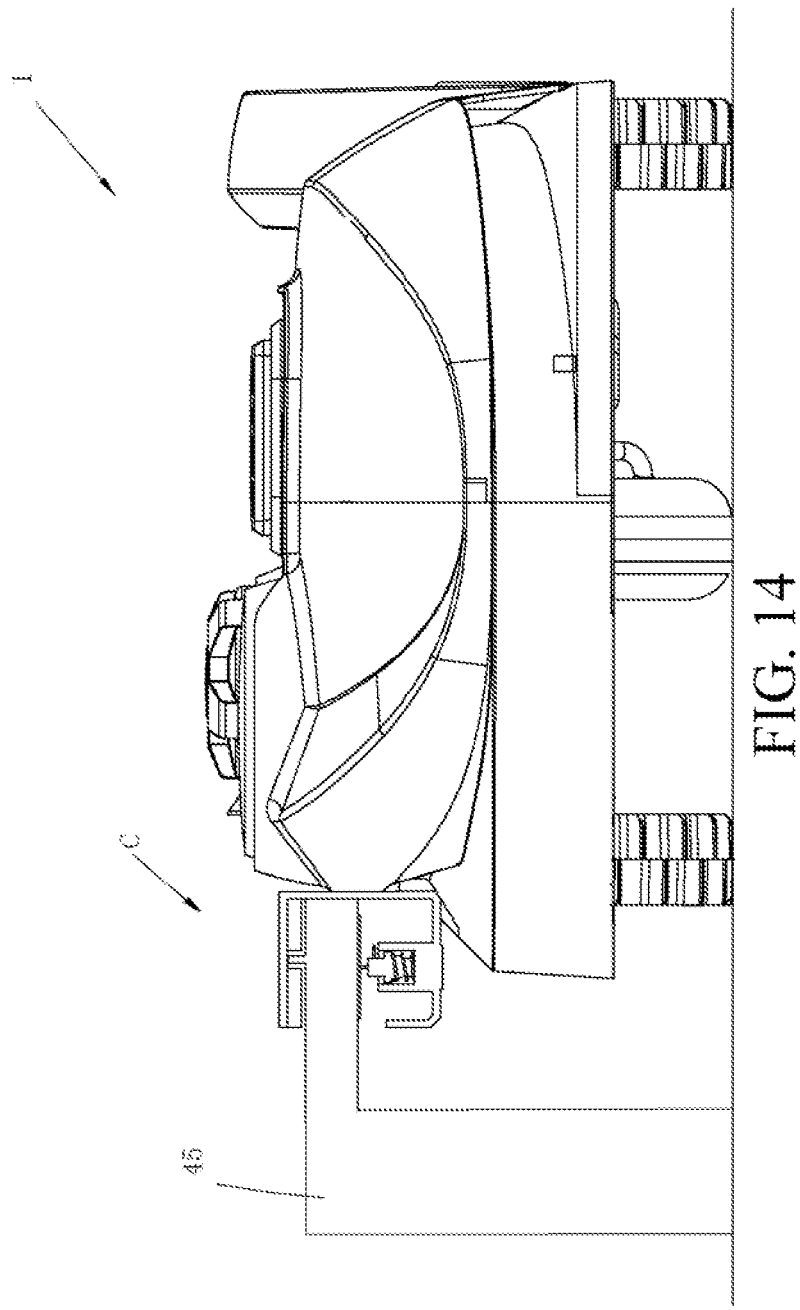
FIG. 14 is a schematic diagram of a charging state of a robotic mower according to an example embodiment.
Figure 15:
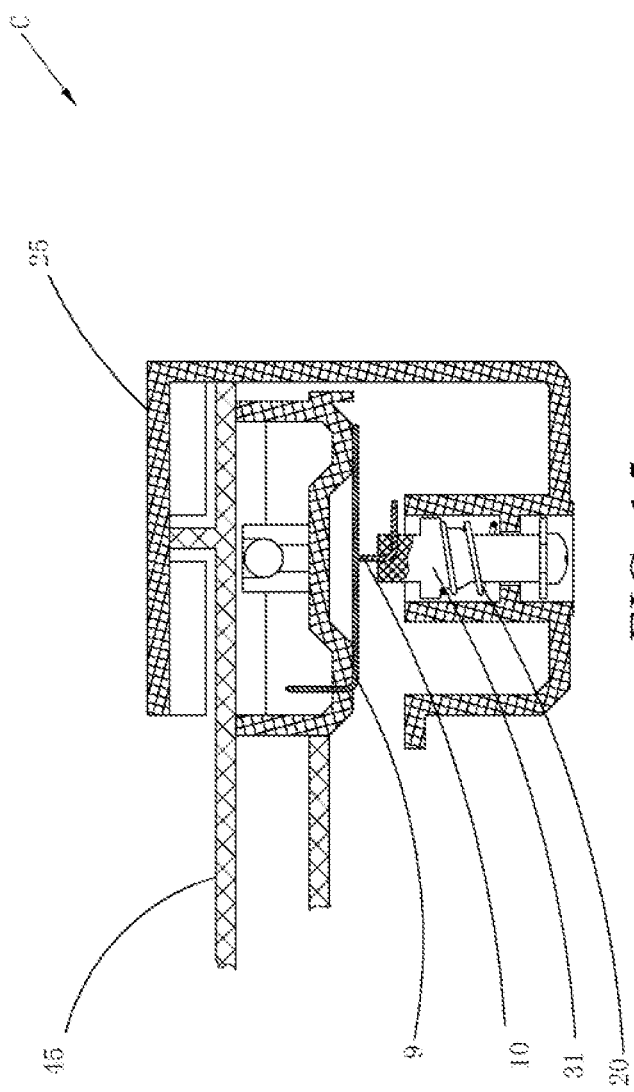
FIG. 15 is an arrangement local sectional view of a charging contact in a charging state of the automatic working system shown in FIG. 14.

FIG. 14 and FIG. 15 show an automatic working system provided by an example embodiment. For the sake of expression, the same structures are represented by the same numbers, which is not described herein again.

Referring to FIG. 14 and FIG. 15, a charging connector 10 is elastically connected to the robotic mower by using an elastic connection portion, and the charging connector 10 can telescopically move relative to the robotic mower 1. Two charging connectors 10 are disposed on a side wall of a charging slot 25 straightly. Specifically, the elastic supporting portion comprises a supporting portion 31 and a spring 20 of the charging connector 10. A local section C is obtained along the direction of a section N. In this embodiment, the charging contact 9 is fixedly disposed on the charging support 45 straightly, the charging connector 10 is also correspondingly disposed in the charging slot 25 straightly, and the charging connector 10 is elastically connected to the charging slot 25 by using the elastic connection portion. The charging connector and the charging contact may also be disposed in other manners, for example, disposed straightly. The charging connector 10 has an approximately trapezoid shape with round and smooth corners. The charging connectors may telescopically move under the action of the spring, and such elastic connection ensures full contact between the charging contact and the charging connector, and can buffer the impact against the charging station caused by a machine entering the station to be charged.

An example embodiment provides a method for returning a robotic mower to a charging station according to an automatic working system.

Figure 16:
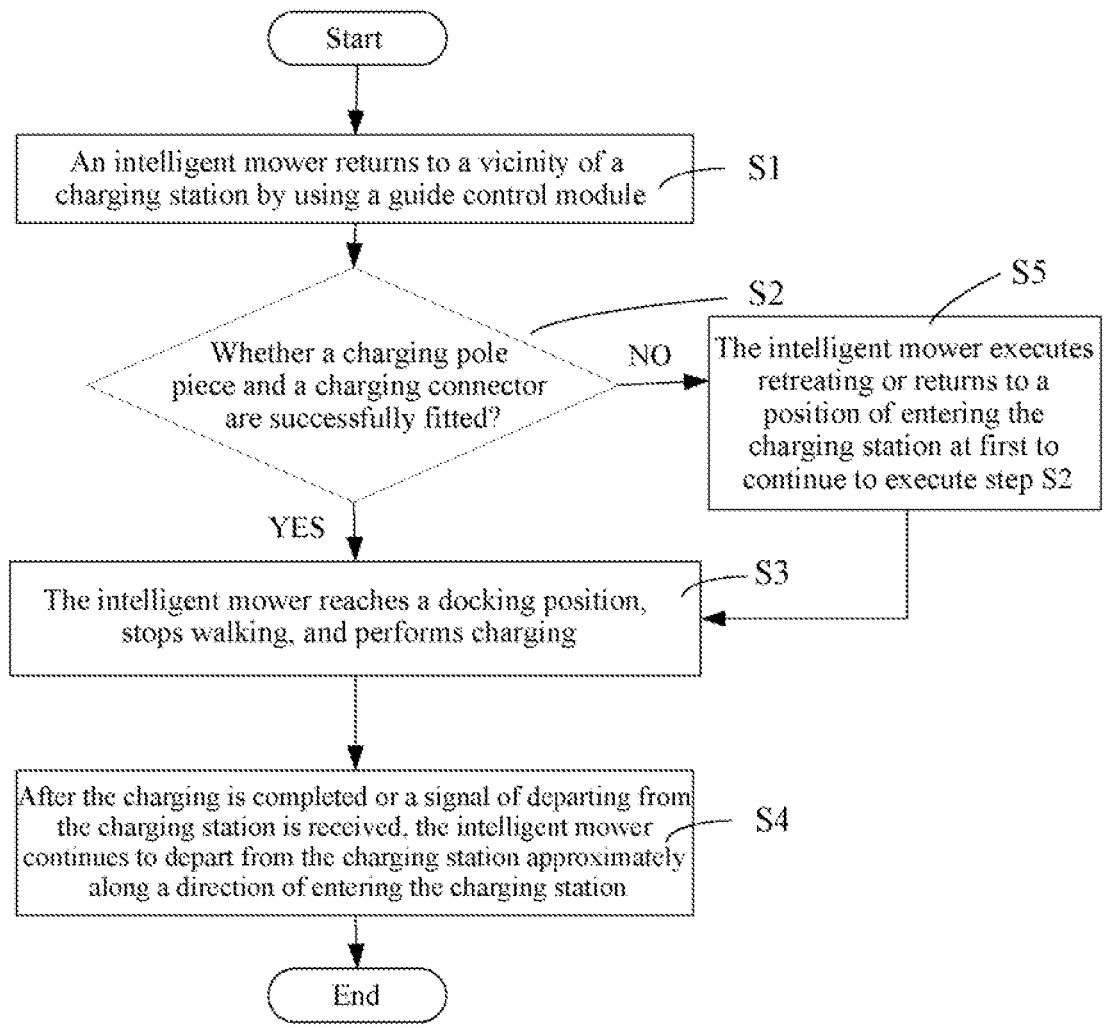
FIG. 16 is a flowchart of a method for returning a robotic mower to a charging station of the automatic working system of the present invention.

Referring to FIG. 16, the method includes the following steps.

S1: The robotic mower returns to a vicinity of the charging station by using a guide control module.

The robotic mower can automatically return to the charging station by using a guide control module and be docked with the charging station to be charged under a condition of insufficient electric quantity or the like. The guide control module controls, by means of detecting a returning signal, the robotic mower to return to the charging station. In the present embodiment, the robotic mower returns to the charging station by means of detecting a border signal. In other embodiments, the robotic mower may return to the charging station in other manners. For example, the robotic mower determines a position of the charging station by using a satellite navigation technology and returns, or the robotic mower recognizes the position of the charging station by using an image technology and returns, which is not described herein again.

S2: After reaching the vicinity of the charging station, continue to advance according to a control signal of the guide control module, and detect whether the charging contact and the charging connector are successfully connected.

After the robotic mower returns to the vicinity of the charging station by using the guide control module, the robotic mower continues to advance. When the charging connector on the robotic mower is successfully connected to the charging contact, the robotic mower detects a current or voltage signal after fitting to judge whether the docking is successful.

S3: If a judgment result of S2 is yes, the robotic mower stops walking and is charged;

S4: If the charging of the robotic mower is completed or a signal of departing from the charging station is received, the robotic mower continues to depart from the charging station approximately along a direction of entering the charging station.

If the robotic mower receives a signal of departing from the charging station in a charging process or the charging is completed, the robotic mower continues to walk approximately along a direction of entering the charging station to depart from the charging station, without a need to retreat. The dents on a lawn are relieved, meanwhile, the robotic mower is enabled to mow the grass behind the charging station, and mowing efficiency is improved.

S5: If the judgment result of S2 is no, the robotic mower executes retreating or returns to an initial position of entering the charging station and continues to execute step S2.

When the robotic mower does not implement successful fitting between the charging contact and the charging connector in the advancing direction, that is, no charging circuit is formed, the robotic mower executes retreating or returns to the initial position of entering the charging station to continue to execute the step S2. Specifically, the robotic mower also has a mechanism for recognizing a relative position of the charging station. When the robotic mower recognizes that the robotic mower has crossed over the charging station, the robotic mower judges that the docking is failed, and then executes retreating or returns to the initial position of entering the charging station to continue to execute step S2.

In the embodiments, the robotic mower 1 may be an intelligent or semi-intelligent device such as a robotic mower, a riding type mower, an intelligent dust collector, or the like. The charging station 4 may be a control platform, the charging station, or the like.

A person skilled in the art may conceive that the present invention may have other implementations. However, as long as the technical essences adopted by the embodiments are same as or similar to the present invention, the embodiments or any changes and substitutions made based on the present invention fall within the protective scope of the present invention.

What is claimed is:

1. An automatic working system, comprising:
a robotic mower automatically moving and mowing in a working area, and a charging station for docking and charging of the robotic mower, wherein
the charging station comprises:
a charging support; and
a charging contact mounted on the charging support;
the robotic mower comprises:
a housing; and
a charging connector, disposed on a lateral side of the housing, and connected to the charging contact to receive electric energy when the robotic mower is in a docking position in which the robotic mower is docked with the charging station;
when the robotic mower is in the docking position, the charging support is located on a lateral side of the robotic mower, and the charging station is open in a front and back direction of the robotic mower to form a passage for the robotic mower to enter and exit the charging station approximately along a same direction;
wherein at least one of the charging contact and the charging connector is movable between an extending-out position and a retreating position, and in the retreating position, the robotic mower continues to move along a moving direction of entering the docking position to depart from the charging station; and
wherein at least one of the charging contact and the charging connector is mounted by an elastic connection portion, so as to elastically move between the extending-out position and the retreating position.

2. The automatic working system according to claim 1, wherein the charging contact is mounted on the charging support by the elastic connection portion, and the charging contact telescopically moves or rotates relative to the charging support.

3. The automatic working system according to claim 2, wherein single charging contact is disposed to form an acute angle or right angle with a direction of the robotic mower entering the charging station, and rotates to a direction of decreasing the acute angle or right angle.

4. The automatic working system according to claim 2, wherein single charging contact is disposed to form an approximate right angle with a direction of the robotic mower entering the charging station, and rotates to a direction of decreasing or increasing the right angle.

5. The automatic working system according to claim 1, wherein the robotic mower reaches the docking position from an advancing direction and a retreating direction.

6. The automatic working system according to claim 5, wherein the charging contact moves to a direction of the robotic mower entering the charging station and a direction opposite to the entering direction.

7. The automatic working system according to claim 1, wherein the charging connector is mounted on the housing by using the elastic connection portion, and the charging contact telescopically moves or rotates relative to the robotic mower.

8. The automatic working system according to claim 7, wherein the robotic mower further comprises a housing, a charging slot is disposed on a lateral side of the housing, the charging slot is open in a front and back direction of the robotic mower entering the charging station, and is open in at least one lateral side of the charging slot, and the charging connector is disposed on a lateral side of the charging slot.

9. The automatic working system according to claim 1, wherein the charging support is located outside the working area.

10. The automatic working system according to claim 9, wherein the charging station is open in another lateral side opposite to the charging support.

11. A charging station for a robotic mower, comprising
a charging support;
a charging contact mounted on the charging support, wherein the charging contact provides a charging voltage for the robotic mower when the robotic mower is in a docking position in which the robotic mower is docked with the charging station, wherein
when the robotic mower is in the docking position, the charging support is located on a lateral side of the robotic mower, and the charging station is open in a front and back direction of the docking position of the robotic mower to form a passage for the robotic mower to enter and exit the charging station along a same direction;
wherein the charging contact is movable between an extending-out position and a retreating position, and in the retreating position, the robotic mower continues to move along a moving direction of entering the docking position to depart from the charging station; and
wherein the charging contact is mounted by an elastic connection portion, so as to elastically move between the extending-out position and the retreating position.

12. The charging station according to claim 11, wherein another lateral side of the charging station opposite to the charging support is open.

13. The charging station according to claim 11, wherein single charging contact is disposed to form an acute angle or right angle with a direction of the robotic mower entering the charging station, and rotates to a direction of decreasing the acute angle or right angle.

14. The charging station according to claim 11, wherein single charging contact is disposed to form an approximate right angle with a direction of the robotic mower entering the charging station, and rotates to a direction of decreasing or increasing the right angle.

15. The charging station according to claim 11, further comprising a bottom plate, wherein the charging support projects upwardly from at least one lateral side of the bottom plate.

16. A method for returning a robotic mower to a charging station, wherein the robotic mower automatically moves and mows in a working area, the charging station allows docking and charging of the robotic mower,
the charging station comprises:
a charging support; and
a charging contact mounted on the charging support; and
the robotic mower comprises:
a housing; and
a charging connector disposed on a lateral side of the housing and connected to the charging contact to receive electric energy when the robotic mower is in a docking position in which the robotic mower is docked with the charging station, the robotic mower also has a guiding control module controlling the robotic mower to return to the charging station, and the method comprises the following steps:
S1: the robotic mower returns to a vicinity of the charging station by using the guide control module;
S2: after reaching the vicinity of the charging station, continue to advance according to a control signal of the guide control module, and detect whether the charging contact and the charging connector are successfully connected;
S3: if a judgment result of S2 is yes, the robotic mower reaches the docking position, and the robotic mower executes braking for charging;
S4: if the charging of the robotic mower is completed or a signal of departing from the charging station is received, the robotic mower departs from the charging station approximately along a direction of entering the charging station.

17. The method for returning to the charging station according to claim 16, wherein if the judgment result of S2 is no, the method further comprises S5: the robotic mower executes retreating or returns to an initial position of entering the charging station and continues to execute step S2.

* * * * *